US011104279B2

(12) United States Patent
Solar et al.

(10) Patent No.: US 11,104,279 B2
(45) Date of Patent: Aug. 31, 2021

(54) VEHICLE VISION SYSTEM WITH ADAPTIVE REVERSING LIGHT

(71) Applicants: Magna Electronics Solutions GmbH, Sailauf (DE); Magna Electronics Europe GmbH & Co. OHG, Sailauf (DE); ZKW Group GmbH, Wieselburg (AT)

(72) Inventors: Martin Solar, Erlenbach (DE); Stefan Graf, Wetzlar (DE); Julian Baker, Mank (AT); Matthäus Artmann, Ybbs an der Donau (AT)

(73) Assignees: Magna Electronics Solutions Gmbh, Sailauf (DE); Magna Electronics Europe GmbH & Co. OHG, Sailauf (DE); ZKW Group GmbH, Wieselburg (AT)

(*) Notice: Subject to any disclaimer, the term of this patent is extended or adjusted under 35 U.S.C. 154(b) by 0 days.

(21) Appl. No.: 16/693,523

(22) Filed: Nov. 25, 2019

(65) Prior Publication Data

US 2020/0164814 A1 May 28, 2020

Related U.S. Application Data

(60) Provisional application No. 62/771,258, filed on Nov. 26, 2018.

(51) Int. Cl.

*B60R 1/06* (2006.01)
*B60R 11/04* (2006.01)
*H04N 7/18* (2006.01)

(52) U.S. Cl.

CPC ................ *B60R 11/04* (2013.01); *B60R 1/06* (2013.01); *H04N 7/183* (2013.01); *B60R 2300/103* (2013.01); *B60W 2420/42* (2013.01)

(58) Field of Classification Search

None

See application file for complete search history.

(56) References Cited

U.S. PATENT DOCUMENTS 4,706,168 A * 11/1987 Weisner ................ G01B 11/00 362/18
5,550,677 A 8/1996 Schofield et al.

(Continued)

FOREIGN PATENT DOCUMENTS

DE 102005055087 A1 5/2007
DE 102012004817 A1 9/2013

(Continued)

OTHER PUBLICATIONS

International Search Report and Written Opinion dated Jun. 4, 2020 from corresponding PCT Application No. PCT/EP2019/082439.

*Primary Examiner* — Mohammad J Rahman
(74) *Attorney, Agent, or Firm* — Honigman LLP

(57) ABSTRACT

A vehicular vision system includes a camera disposed at a vehicle and having a field of view rearward of the vehicle, a light source disposed at the vehicle and operable to emit light, and a control including an image processor. The control, responsive to detection of the object present in the field of view of the camera, determines a region of the field of view of the camera at which a detected object is located. The control determines an illumination level at the detected object and, responsive to the determined illumination level at the detected object being greater than an upper threshold level or less than a lower threshold level, controls the respective individually controllable light segment of the light source for that region of the field of view of the camera at which the detected object is located to adjust intensity of light emitted by that light segment.

29 Claims, 3 Drawing Sheets

32ac
32a
32ab
32b
32aa
32cb
32c
32d

(56) References Cited

U.S. PATENT DOCUMENTS 5,670,935 A 9/1997 Schofield et al.
5,949,331 A 9/1999 Schofield et al.
7,914,187 B2 3/2011 Higgins-Luthman et al.
8,162,518 B2 4/2012 Schofield
8,764,256 B2 7/2014 Foote et al.
9,896,022 B1 * 2/2018 Pertsel .................. H04N 7/183
10,075,650 B2 * 9/2018 McElroy ................ B60R 11/04
10,247,941 B2 * 4/2019 Fursich ............. G02B 27/0075
10,326,969 B2 * 6/2019 Wierich ................. G06T 5/002
10,576,896 B2 3/2020 Huizen et al.
2009/0097038 A1 * 4/2009 Higgins-Luthman ........................ B60G 17/019 356/602
2011/0211359 A1 * 9/2011 Shiao ........................ B62J 6/02 362/476
2013/0049599 A1 * 2/2013 Logiudice ............. H05B 45/37 315/122
2013/0201324 A1 * 8/2013 Cardoso .............. G06K 9/2036 348/135
2014/0081441 A1 * 3/2014 Regan .................... G06F 30/13 700/98
2015/0042806 A1 * 2/2015 Wierich ................... G06T 5/50 348/148
2015/0172527 A1 * 6/2015 McElroy ............... B60Q 1/143 348/148
2015/0181100 A1 * 6/2015 Publicover ............ H04N 5/332 348/78
2016/0163302 A1 * 6/2016 Klabunde ............... G01H 3/10 381/56
2016/0311374 A1 10/2016 May
2017/0017848 A1 * 1/2017 Gupta .................. B60W 30/06
2017/0212226 A1 * 7/2017 Broers ................... G01S 17/89
2017/0217367 A1 8/2017 Pflug et al.
2017/0309159 A1 * 10/2017 Pimentel ............. G01N 33/004
2017/0329332 A1 * 11/2017 Pilarski ............ B60W 30/0956
2018/0022266 A1 1/2018 Tzeng
2018/0113200 A1 * 4/2018 Steinberg ............... G01S 17/93
2019/0001868 A1 * 1/2019 Kaino ................. B60Q 1/1423
2019/0128497 A1 * 5/2019 Tessnow ............... H05B 45/48

FOREIGN PATENT DOCUMENTS

EP 1515293 A1 3/2005
EP 1876829 A1 1/2008
EP 3388814 A2 10/2018
WO 2017019725 A1 2/2017

* cited by examiner

VEHICLE VISION SYSTEM WITH ADAPTIVE REVERSING LIGHT

CROSS REFERENCE TO RELATED APPLICATION

The present application claims the filing benefits of U.S. provisional application Ser. No. 62/771,258, filed Nov. 26, 2018, which is hereby incorporated herein by reference in its entirety.

FIELD OF THE INVENTION

The present invention relates generally to a vehicle vision system for a vehicle and, more particularly, to a vehicle vision system that utilizes a rear backup camera.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (such as a rear backup camera disposed at a rear portion of the vehicle and having a field of view rearward of the vehicle) to capture image data representative of images exterior of the vehicle, and provides a light source disposed at the vehicle and operable to emit light. Light emitted by the light source, when operated, illuminates at least a portion or region of the field of view of the camera. The light source comprises a plurality of light segments, and light emitted by each light segment of the light source, when operated, illuminates a respective portion or region of the field of view of the camera. A control comprises an image processor that processes image data captured by the camera. The control, responsive to image processing of image data captured by the camera, controls intensity of the light emitted by each light segment to provide enhanced object detection.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
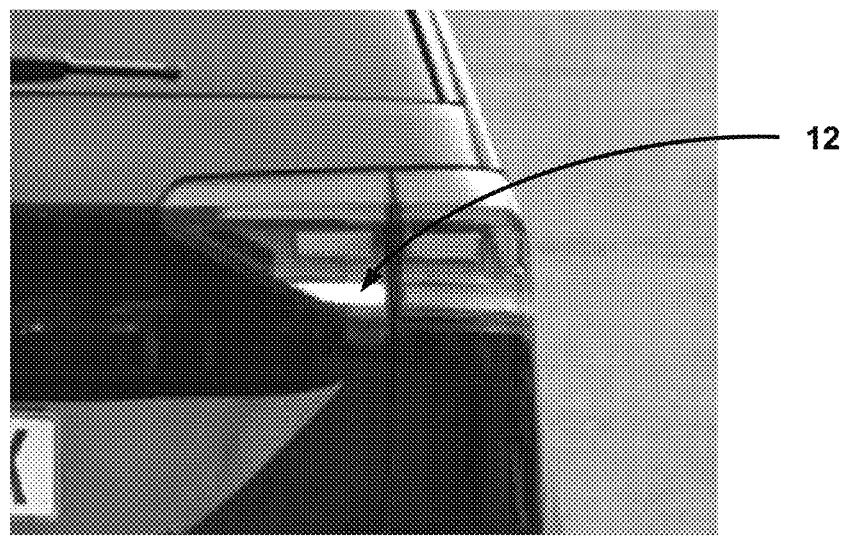
FIG. 1 is a perspective view of a vehicle with a vision system that incorporates a camera and a rear light source in accordance with the present invention.
Figure 2:
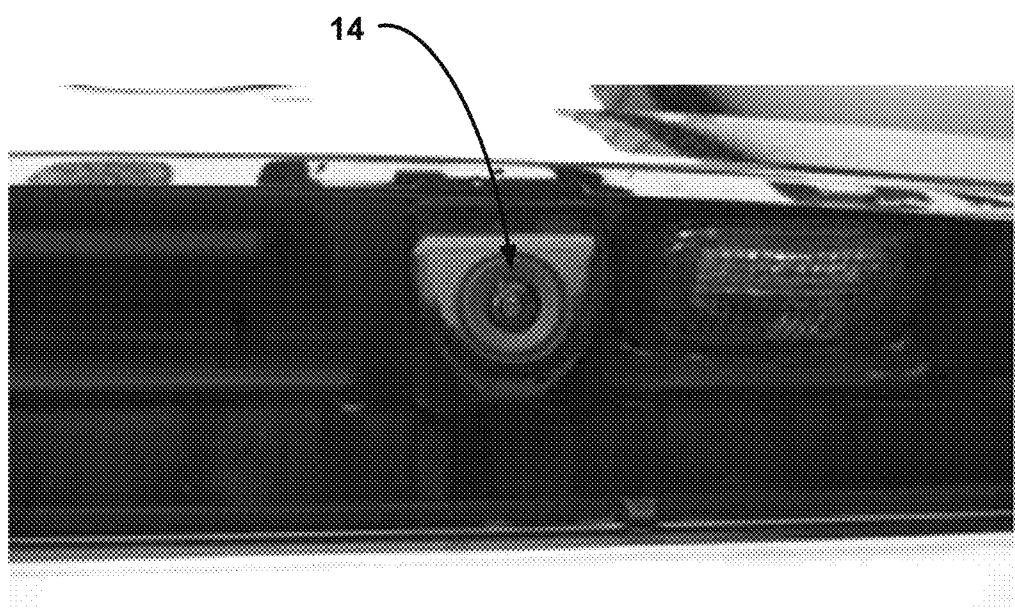
FIG. 2 is a perspective view of the vehicle, showing the rear camera.

Referring now to the drawings and the illustrative embodiments depicted therein, a vehicle includes an imaging system or vision system that includes at least one rearward viewing imaging sensor or camera 14 (FIGS. 2 and 3) that captures images exterior and rearward of the vehicle, with a rearward directed light 12 (FIGS. 1 and 3) that provides illumination that encompasses at least part of the rearward field of view of the camera 14. The camera 14 includes a lens for focusing images at or onto an imaging array or imaging plane or imager of the camera. The vision system includes a control or electronic control unit (ECU) or processor that is operable to process image data captured by the camera 14 and that may detect objects or the like and/or provide displayed images at a display device for viewing by the driver of the vehicle. The data transfer or signal communication from the camera 14 to the ECU may comprise any suitable data or communication link, such as a vehicle network bus or the like of the equipped vehicle.

The vehicle control system can (semi-) autonomously control a vehicle entering and leaving a parking space. The control unit in the vehicle analyzes the environmental data of several vehicle-sensors (e.g. camera, ultrasonic sensor, radar sensor and/or the like) and intervenes in the cross and length steering of the vehicle. In situations with reduced or low light conditions, the imaging sensor is supported by an additional light source (reversing light when driving in reverse). When the light source is activated, highly reflective object reflections (off highly reflective objects or specularly reflective objects in the field of view of the camera) can lead to overload of the imaging sensor. This can lead to errors in the data analysis, whereby critical objects located on the road may not be detected (correctly) and/or the reflecting object is detected as a (larger) obstacle that is in the vehicle's projected path of travel, although it is in reality a smaller object and/or not located on the calculated or planned route or rearward path of travel of the vehicle.

The control system of the present invention uses a control unit, an adaptive and segmented reversing light 12, and an imaging sensor or camera 14, and controls the components to provide optimal illumination for the specific driving situation.

Figure 3:
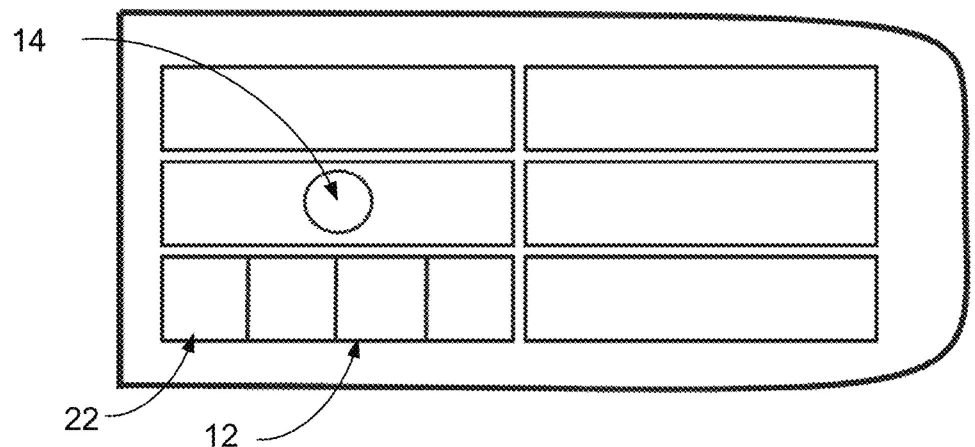
FIG. 3 is a schematic view of a vehicular device that incorporates a camera and a rear light source in accordance with the present invention.
Figure 4:
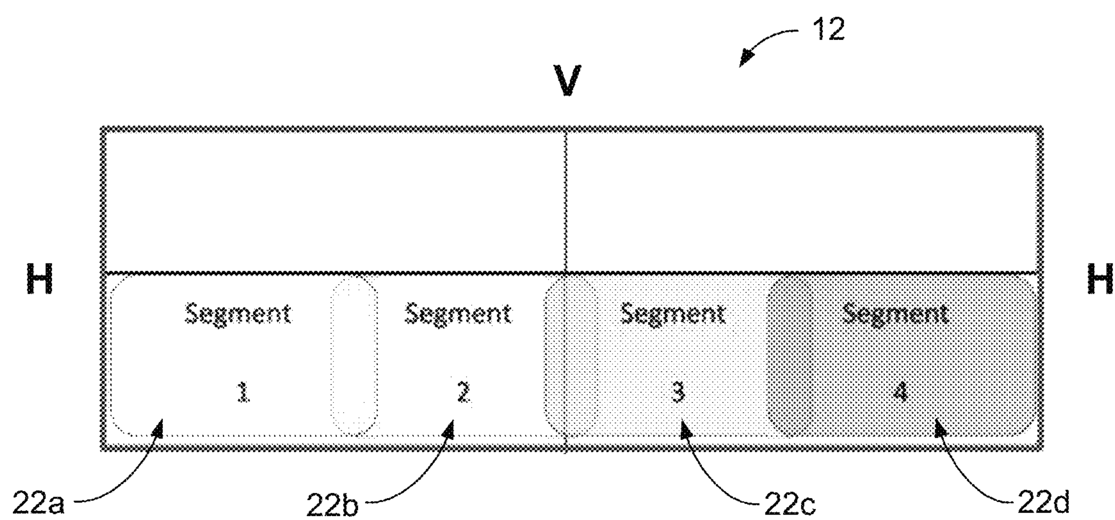
FIG. 4 is a schematic of a light source with four individually illuminated segments.
Figure 5:
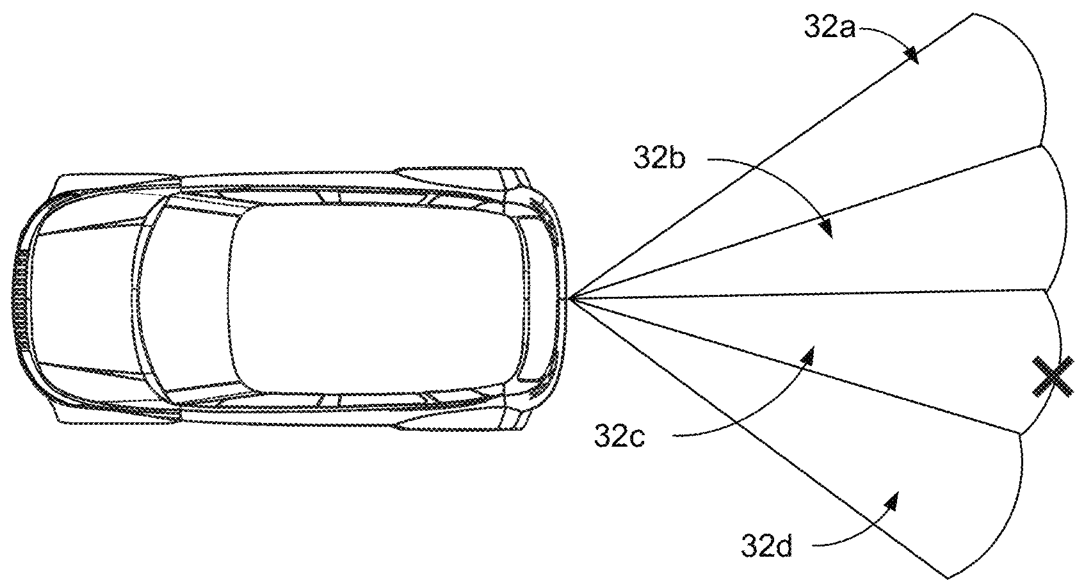
FIGS. 5 and 6 are top views of a vehicle with the vision system that illuminates individual regions rearward of the vehicle via a plurality of individually actuatable light source segments.

The camera captures image data and highly reflective objects (e.g., smooth or reflectant objects that result in specular reflection of light incident thereon) present in the field of view of the camera are detected by the camera 14. The captured image data is communicated to the control unit/the reversing light, including intensity and location information. The reversing light 12 comprises several individually controllable (and dimmable) segments or light sources 22, 22*a-d* (such as individual or groups of light emitting diodes), such as shown in FIGS. 3 and 4. The individual segments 22*a-d*, when electrically powered, and such as shown in FIG. 5, illuminate respective regions 32*a-d* rearward of the vehicle. The control, responsive to processing by an image processor of image data captured by the rearward viewing camera 14 and provided to the control, adjusts or controls the light source 12 to adjust (increase/decrease) the required or determined level of intensity at the concerned areas. For example, and such as shown in FIG. 5, if a bright object is detected in region 32*c*, the control may reduce the power or intensity of the illumination segment 22*c*. Alternatively, if an object is detected but is not well illuminated (e.g., the object is a diffuse reflecting or partially light absorbing object), the system may increase the power or intensity of the respective illumination segment to enhance detection and/or identification or classification of the object. The information is communicated via a bus-system of the vehicle. With this system it is possible to illuminate an area homogeneously. A glare/blinding effect from strongly reflecting objects (obstacles) is suppressed (by reducing the intensity of the light source segment 22*a-d* that is illuminating that object) and an error free image recognition with very good contrast conditions is achieved.

Figure 6:
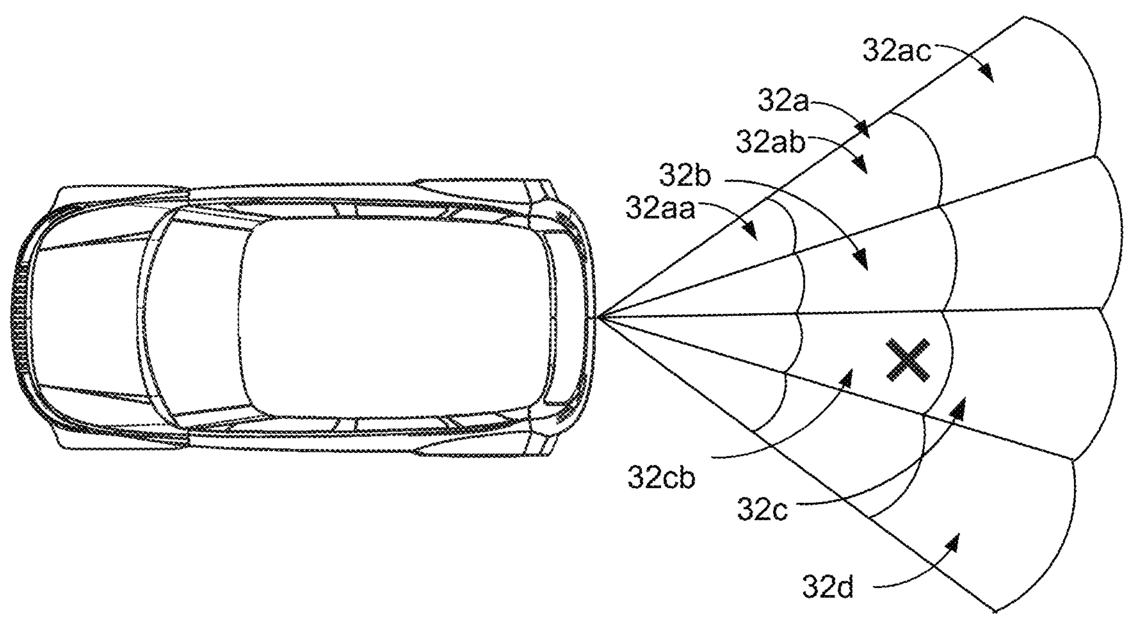

The light source 12 may comprise a high definition light source comprising a plurality of individually operable light sources, for example, a plurality of light emitting diodes (LEDs), which preferably are arranged in rows and columns to form a matrix like arrangement of light sources, wherein a column of light sources corresponds to a respective one of the plurality of light segments 22*a-d*. Thus, for example, and such as shown in FIG. 6, each light segment 22*a-d* may comprise three individual segments or LEDs, which, when individually powered, illuminate a respective region 32*aa*-32*dc* rearward of the vehicle. The matrix-like arrangement of light sources enables each individual illuminated region 32*a-d* to be divided into a plurality of sub-regions or sub-segments 32*aa*-32*dc*. Each sub-segment 32*aa*-32*dc* of the plurality of sub-segments can be illuminated individually by a corresponding light source of the light segments 22*a-d*.

FIG. 5 shows four illuminated segments 32*a-d*, and FIG. 6 shows where each of the illuminated segments comprises three sub-segments (e.g., sub-segments 32*aa*-32*ac* of segment 32*a*). Thus, the light source may have a two dimensional array (having multiple rows and multiple columns of LEDs) of at least twelve LEDs or subsets of LEDs (i.e., each individually actuatable segment may comprise a single LED or a plurality of LEDs that are electrically powered and controlled together), with each LED or subset of LEDs illuminating (when electrically powered) a respective sub-region or sub-segment 32*aa*-32*dc* of the area rearward of the vehicle. In FIG. 6, an object, marked with "X", is located in a middle sub-segment 32*cb* of segment 32*c*, wherein the corresponding LED (e.g., one of the three LEDs of segment 22*c*), which illuminates that sub-segment, can be operated to increase or decrease illumination of that sub-segment. If the object gets illuminated by the light source and the object is a highly reflective object, light can be reflected from the object towards the imager of the camera 14 and cause an overexposure of the imager. To prevent this overexposure of the imager, the control of the vehicular vision system is configured to decrease the illumination of a particular illuminated segment 32*a-d* or sub-segment 32*aa*-32*dc*, in which the highly reflective object is located, e.g. when the control determines that the illumination level at the highly reflective object is greater than an upper threshold level, by dimming the corresponding light source 22*a-d*.

The light source 12 is preferably a reversing light or part of a reversing light for a vehicle. The camera 14 is preferably a reversing camera for a vehicle.

The control system, responsive to detection, via image processing of captured image data, of a highly reflective object in a portion or region of the field of view of the camera 14, controls intensity of light emitted by the respective light segment 22*a-d* (that is illuminating the detected highly reflective object) to reduce illumination of the highly reflective object. The control system, responsive to detection, via image processing of captured image data, of a low-illuminated object in a portion or region of the field of view of the camera 14, e.g. when the control system determines that the illumination level at the low-illuminated object is less than a lower threshold level, controls intensity of light emitted by the respective light segment 22*a-d* to increase illumination of the low-illuminated object.

The system thus adjusts the individual light segment or segments or individual LED or subset of LEDs when the determined intensity level of light or illumination at a detected object or region is above an upper threshold illumination level or below a lower threshold illumination level. The upper and lower threshold illumination levels may be set or preselected or may be dynamically adjusted, such as responsive to a determined ambient light level. For example, the system may be responsive at least in part to an ambient light sensor of the vehicle or the system may determine an ambient lighting condition based on processing of image data captured by the camera. In bright lighting conditions, such as encountered on a sunny day, the camera's operating parameters may adapt to the brighter overall scene, such that the upper threshold illumination level may be increased and the lower threshold illumination level may also be increased to accommodate the different camera settings. Likewise, in low ambient lighting conditions, such as encountered at nighttime, the camera's operating parameters may adapt to the lower overall illumination of the scene, such that the lower threshold illumination level may be decreased and the upper threshold illumination level may also be decreased to accommodate the different camera settings.

Optionally, for example, the system may determine an average illumination intensity over all of the sub-regions in the field of view of the camera and then may adjust the illumination intensity of one or more segments or sub-segments of the light source when the determined intensity of the sub-region where the detected object is located is greater than a threshold amount above the determined average illumination intensity level or less than a threshold amount below the determined average illumination intensity level. Thus, the system automatically adapts to bright or highly reflective detected objects or light absorbing or diffuse or low reflective detected objects so that the illumination is decreased at specular reflective objects and increased at diffuse reflective objects.

The control system controls intensity of the light emitted by each light segment 22*a-d* during a reversing maneuver of the vehicle, such as a parking maneuver, where the control may control intensity of the light emitted by each light segment 22*a-d* to provide enhanced detection of parking space markers during the parking maneuver. For example, the control may increase intensity of light emitted by a particular light segment 22*a-d* to enhance detection and identification of a respective parking space marker or may decrease intensity of light emitted by a particular light segment to enhance detection and identification of a respective parking space marker. In particular situations, the system may increase intensity of light emitted by a particular light segment 22$a$-$d$ to enhance detection and identification of a respective parking space marker, and may decrease intensity of light emitted by another particular light segment 22$a$-$d$ to enhance detection and identification of another respective parking space marker, depending on the lighting conditions and environment at which the vehicle is parking.

Thus, the system of the present invention may provide optimal, homogeneous illumination of a scene even at dynamic lighting conditions or reflections. The system thus limits or avoids overloading of the imager or imaging sensor 14. Also, the system limits or avoids errors in the image data processing or image analysis. The system thus provides enhanced detection of objects and unambiguous detection of the (free) environment, such as during a reversing or parking maneuver of the vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a vehicle, the camera having a field of view at least rearward of the vehicle, the camera operable to capture image data representative of an area rearward of the vehicle;

a light source disposed at the vehicle and operable to emit light when activated;

wherein the light source comprises a plurality of individually controllable light segments, and wherein each individually controllable light segment of the plurality of individually controllable light segments, when individually activated, illuminates a respective region within the field of view of the camera;

a control comprising an image processor and associated circuitry;

wherein image data captured by the camera is provided to the control for processing by the image processor;

wherein the control, via processing by the image processor of image data captured by the camera, detects first and second objects present in the field of view of the camera;

wherein the control, responsive to detection of the first and second objects present in the field of view of the camera, determines a first region within the field of view of the camera at which the detected first object is located and determines a second region within the field of view of the camera at which the detected second object is located;

wherein the control, via processing by the image processor of image data captured by the camera, determines a first illumination level at the detected first object and a second illumination level at the detected second object;

wherein the control, responsive to the determined first illumination level at the detected first object being greater than an upper threshold level, controls a first individually controllable light segment of the light source for that region within the field of view of the camera at which the detected first object is located to reduce intensity of light emitted by the first individually controllable light segment; and wherein the control, responsive to the determined second illumination level at the detected second object being less than a lower threshold level, controls a second individually controllable light segment of the light source for that region within the field of view of the camera at which the detected second object is located to increase intensity of light emitted by the second individually controllable light segment.

2. The vehicular vision system of claim 1, wherein the control, responsive to the determined illumination level at the detected first object being greater than the upper threshold level, controls the respective individually controllable light segment that illuminates the region within the field of view of the camera at which the detected first object is located to decrease the intensity of the light emitted by that respective individually controllable light segment to accommodate the detected first object being more reflective than the detected second object.

3. The vehicular vision system of claim 1, wherein the control, responsive to the determined illumination level at the detected second object being lower than the lower threshold level, controls the respective individually controllable light segment that illuminates the region within the field of view of the camera at which the detected second object is located to increase the intensity of the light emitted by that respective individually controllable light segment to accommodate the detected second object being less reflective than the detected first object.

4. The vehicular vision system of claim 1, wherein the control is responsive at least in part to an ambient light level at the vehicle, and wherein the upper threshold level and the lower threshold level are adjusted responsive to the ambient light level at the vehicle.

5. The vehicular vision system of claim 1, wherein the upper threshold level is set as a predetermined amount above an average illumination intensity in the field of view of the camera, and wherein the lower threshold level is set as a predetermined amount below the average illumination intensity in the field of view of the camera.

6. The vehicular vision system of claim 1, wherein the control is configured to control each of the individually controllable light segments to adjust the intensity of light emitted by each respective individual controllable light segment of the light source to obtain a homogeneous illumination level of the field of view of the camera when objects having different reflective characteristics are present in the field of view of the camera.

7. The vehicular vision system of claim 1, further comprising a display device disposed in a cabin of the vehicle and viewable by a driver of the vehicle, the display device configured to display video images derived from image data captured by the camera.

8. The vehicular vision system of claim 1, wherein the control is configured to control the individually controllable light segments to adjust the intensity of light emitted by the individually controllable light segments of the light source during a reversing maneuver of the vehicle.

9. The vehicular vision system of claim 1, wherein the control is configured to control the individually controllable light segments to adjust the intensity of light emitted by the individually controllable light segments of the light source during a parking maneuver of the vehicle.

10. The vehicular vision system of claim 9, wherein, during the parking maneuver, the control, via processing by the image processor of image data captured by the camera, detects a parking-space marker of a parking space, and wherein the control, responsive to detecting the parking-space marker of the parking space, controls at least one of the individually controllable light segments to adjust the intensity of the at least one of the individually controllable light segments to enhance detection and identification of the parking-space marker.

11. The vehicular vision system of claim 10, wherein the control increases the intensity of the at least one of the individually controllable light segments to enhance detection and identification of the parking-space marker.

12. The vehicular vision system of claim 11, wherein the control controls the others of the individually controllable light segments to decrease the intensity of light emitted by the others of the individually controllable light segments.

13. The vehicular vision system of claim 1, wherein each individually controllable light segment of the light source comprises at least one light emitting diode.

14. The vehicular vision system of claim 1, wherein each individually controllable light segment of the light source comprises a plurality of light emitting diodes.

15. The vehicular vision system of claim 1, wherein each individually controllable light segment comprises a column of individually controllable light emitting diodes.

16. The vehicular vision system of claim 15, wherein each individually controllable light emitting diode of the individually controllable light segment illuminates, when electrically powered, a sub-region of an illuminated region within the field of view of the camera corresponding to the respective individually controllable light segment.

17. The vehicular vision system of claim 16, wherein the control, responsive to detection of the first and second objects in the field of view of the camera, determines the sub-region of the region within the field of view of the camera at which the respective detected object is located and controls the respective individually controllable light emitting diode of the individually controllable light segment for the sub-region of the region within the field of view of the camera at which the respective detected object is located to adjust the intensity of light emitted by that respective individually controllable light emitting diode.

18. A vehicular vision system, the vehicular vision system comprising:

a camera disposed at a vehicle, the camera having a field of view at least rearward of the vehicle, the camera operable to capture image data representative of an area rearward of the vehicle;

a light source disposed at the vehicle and operable to emit light when activated;

wherein the light source comprises a plurality of individually controllable light segments arranged in rows and columns, and wherein each individually controllable light segment of the plurality of individually controllable light segments, when individually activated, illuminates a respective region within the field of view of the camera;

a control comprising an image processor and associated circuitry;

wherein image data captured by the camera is provided to the control for processing by the image processor;

wherein the control, via processing by the image processor of image data captured by the camera, detects an object present in the field of view of the camera;

wherein the control, responsive to detection of objects present in the field of view of the camera, determines the respective regions within the field of view of the camera at which the respective detected objects are located;

wherein the control, via processing by the image processor of image data captured by the camera, determines respective illumination levels at the respective detected objects;

wherein the control is configured to control each of the individually controllable light segments to adjust the intensity of light emitted by each respective individual controllable light segment of the light source to obtain a homogeneous illumination level of the field of view of the camera when objects having different reflective characteristics are present in the field of view of the camera;

wherein the control, responsive to the determined illumination level at a detected first object being greater than an upper threshold level, controls the respective individually controllable light segment of the light source for that region within the field of view of the camera at which the detected first object is located to reduce intensity of light emitted by that respective individually controllable light segment; and wherein the control, responsive to the determined illumination level at a detected second object being less than a lower threshold level, controls the respective individually controllable light segment of the light source for that region within the field of view of the camera at which the detected second object is located to increase intensity of light emitted by that respective individually controllable light segment.

19. The vehicular vision system of claim 18, wherein the control, responsive to the determined illumination level at the detected first object being greater than the upper threshold level, controls the respective individually controllable light segment that illuminates the region within the field of view of the camera at which the detected first object is located to decrease the intensity of the light emitted by that respective individually controllable light segment to accommodate the detected first object being more reflective than the detected second object.

20. The vehicular vision system of claim 18, wherein the control, responsive to the determined illumination level at the detected second object being lower than the lower threshold level, controls the respective individually controllable light segment that illuminates the region within the field of view of the camera at which the detected second object is located to increase the intensity of the light emitted by that respective individually controllable light segment to accommodate the detected second object being less reflective than the detected first object.

21. The vehicular vision system of claim 18, wherein the control is responsive at least in part to an ambient light level at the vehicle, and wherein the upper threshold level and the lower threshold level are adjusted responsive to the ambient light level at the vehicle.

22. The vehicular vision system of claim 18, wherein the upper threshold level is set as a predetermined amount above an average illumination intensity in the field of view of the camera, and wherein the lower threshold level is set as a predetermined amount below the average illumination intensity in the field of view of the camera.

23. The vehicular vision system of claim 18, wherein the control is configured to control the individually controllable light segments to adjust the intensity of light emitted by the individually controllable light segments of the light source during a reversing maneuver of the vehicle.

24. A vehicular vision system, the vehicular vision system comprising:

a camera disposed at a vehicle, the camera having a field of view at least rearward of the vehicle, the camera operable to capture image data representative of an area rearward of the vehicle;

a light source disposed at the vehicle and operable to emit light when activated;

wherein the light source comprises a plurality of individually controllable light segments, and wherein each individually controllable light segment of the plurality of individually controllable light segments, when individually activated, illuminates a respective region within the field of view of the camera;

a control comprising an image processor and associated circuitry;

wherein image data captured by the camera is provided to the control for processing by the image processor;

wherein the control is configured to control the individually controllable light segments to adjust intensity of light emitted by the individually controllable light segments of the light source during a parking maneuver of the vehicle;

wherein, during the parking maneuver, the control, via processing by the image processor of image data captured by the camera, detects a parking-space marker of a parking space;

wherein the control, responsive to detection of the parking-space marker, determines regions of the field of view of the camera at which the detected parking-space marker is located;

wherein the control, via processing by the image processor of image data captured by the camera, determines an illumination level at the detected parking-space marker; and wherein the control, responsive to the determined illumination level at the detected parking-space marker being greater than an upper threshold level, controls the respective individually controllable light segment of the light source for that region within the field of view of the camera at which the detected parking-space marker is located to reduce the intensity of light emitted by that respective individually controllable light segment.

25. The vehicular vision system of claim 24, wherein the control, responsive to the determined illumination level at the detected parking-space marker being greater than the upper threshold level, controls the respective individually controllable light segment that illuminates the region within the field of view of the camera at which the detected parking-space marker is located to decrease the intensity of the light emitted by that respective individually controllable light segment, while not decreasing the intensity of the light emitted by the other individually controllable light segments of the light source.

26. The vehicular vision system of claim 24, wherein the control, responsive to a determined illumination level at another detected parking-space marker being lower than a lower threshold level, controls the respective individually controllable light segment that illuminates the region within the field of view of the camera at which the other detected parking-space marker is located to increase the intensity of the light emitted by that respective individually controllable light segment.

27. The vehicular vision system of claim 26, wherein the control is responsive at least in part to an ambient light level at the vehicle, and wherein the upper threshold level and the lower threshold level are adjusted responsive to the ambient light level at the vehicle.

28. The vehicular vision system of claim 26, wherein the upper threshold level is set as a predetermined amount above an average illumination intensity in the field of view of the camera, and wherein the lower threshold level is set as a predetermined amount below the average illumination intensity in the field of view of the camera.

29. The vehicular vision system of claim 24, wherein the control is configured to control each of the individually controllable light segments to adjust the intensity of light emitted by each respective individual controllable light segment of the light source to obtain a homogeneous illumination level of the field of view of the camera when surfaces and parking-space markers having different reflective characteristics are present in the field of view of the camera.

* * * * *